(12) United States Patent
Heim

(10) Patent No.: US 9,598,086 B2
(45) Date of Patent: Mar. 21, 2017

(54) METHOD AND DEVICE FOR ASCERTAINING A HEIGHT PROFILE OF A ROAD SITUATED AHEAD OF A VEHICLE

(71) Applicant: Robert Bosch GmbH, Suttgart (DE)

(72) Inventor: Oliver Heim, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 223 days.

(21) Appl. No.: 14/522,055

(22) Filed: Oct. 23, 2014

(65) Prior Publication Data

US 2015/0120153 A1     Apr. 30, 2015

(30) Foreign Application Priority Data

Oct. 25, 2013  (DE) .................. 10 2013 221 696

(51) Int. Cl.
| | |
|---|---|
| *B60W 40/06* | (2012.01) |
| *B60W 30/16* | (2012.01) |
| *G06K 9/00* | (2006.01) |
| *G06T 7/00* | (2006.01) |

(52) U.S. Cl.
CPC ............ *B60W 40/06* (2013.01); *B60W 30/16* (2013.01); *G06K 9/00798* (2013.01); *G06K 9/00805* (2013.01); *G06T 7/0044* (2013.01); *G06T 7/0071* (2013.01); *G06T 2207/10016* (2013.01); *G06T 2207/10021* (2013.01); *G06T 2207/30252* (2013.01); *G06T 2207/30256* (2013.01)

(58) Field of Classification Search
CPC .. B60W 30/16; B60W 40/06; G06K 9/00798; G06K 9/00805; G06T 2207/10016; G06T 2207/10021; G06T 2207/30252; G06T 2207/30256; G06T 7/0044; G06T 7/0071
See application file for complete search history.

(56) References Cited

U.S. PATENT DOCUMENTS

| | | | | |
|---|---|---|---|---|
| 9,434,384 | B2 * | 9/2016 | Kim ..................... | B60W 30/16 |
| 9,443,154 | B2 * | 9/2016 | Stein ....................... | B60R 1/00 |
| 2004/0080450 | A1 * | 4/2004 | Cheong ................ | G01S 7/4026 342/118 |
| 2009/0103781 | A1 * | 4/2009 | Fleury .................. | B60W 40/02 382/104 |
| 2009/0312906 | A1 * | 12/2009 | Bauer ................... | B60W 40/04 701/36 |
| 2010/0299109 | A1 * | 11/2010 | Saito ................... | B60W 40/072 703/1 |
| 2013/0103305 | A1 * | 4/2013 | Becker .................. | G01C 21/32 701/411 |

(Continued)

FOREIGN PATENT DOCUMENTS

DE    10 2004 017 115    10/2005

*Primary Examiner* — Jacob S Scott
(74) *Attorney, Agent, or Firm* — Gerard Messina

(57) ABSTRACT

A method for ascertaining a height profile of a road situated ahead of a vehicle includes: reading in a movement profile of an object which is provided by an image sensor, the movement profile being read in as a plurality of images; reading in at least one parameter with regard to the object from a parameter sensor which is independent of the image sensor; and determining the height profile of the road situated ahead of the vehicle by using at least one vertical position of the object in the image and the parameter.

11 Claims, 3 Drawing Sheets

(56) References Cited

U.S. PATENT DOCUMENTS

| | | | |
|---|---|---|---|
| 2014/0278065 A1* | 9/2014 | Ren | G06T 15/04 701/454 |
| 2015/0049913 A1* | 2/2015 | Zhong | G06T 7/60 382/104 |
| 2015/0086080 A1* | 3/2015 | Stein | G06K 9/00798 382/104 |

* cited by examiner

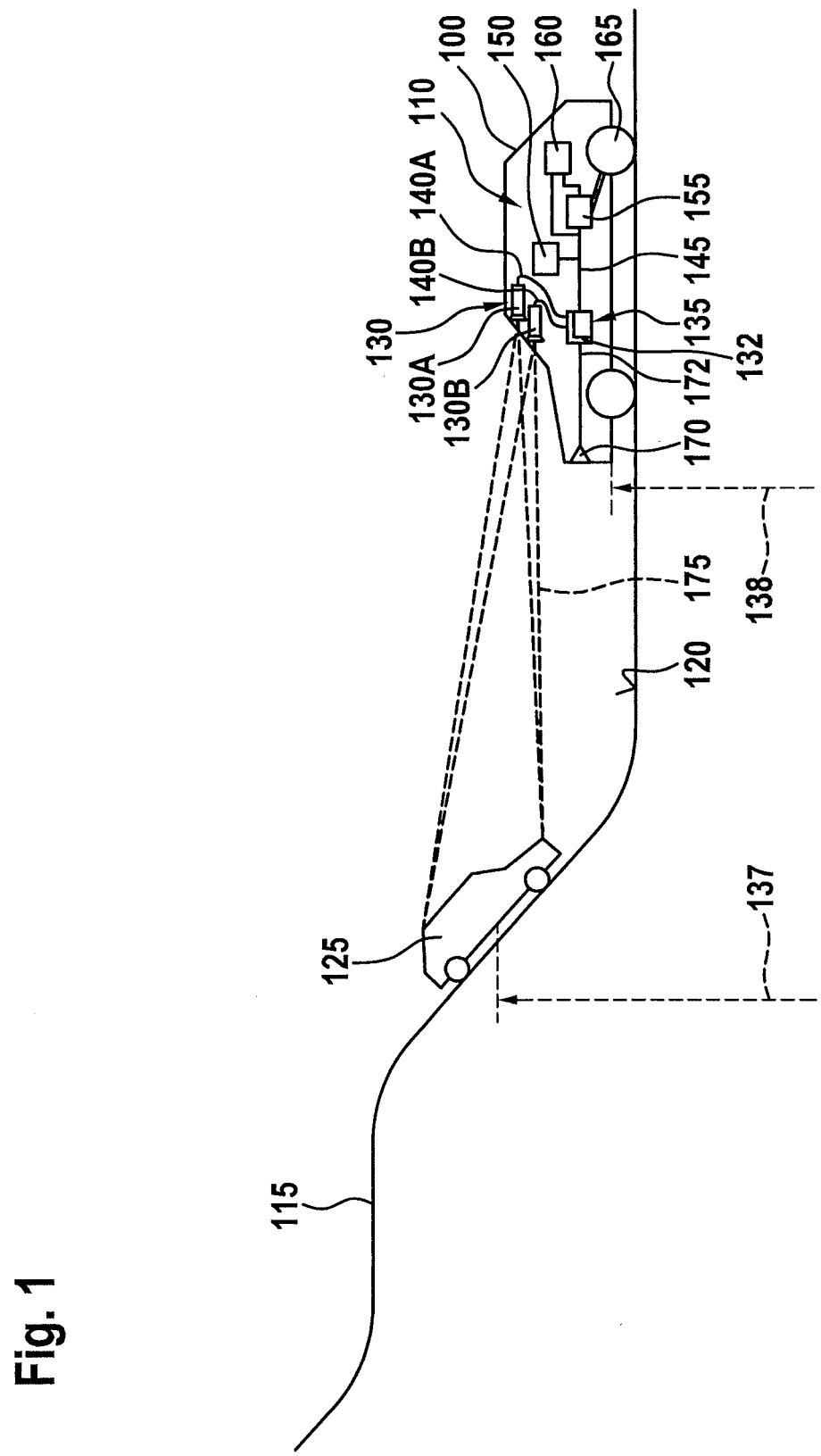

METHOD AND DEVICE FOR ASCERTAINING A HEIGHT PROFILE OF A ROAD SITUATED AHEAD OF A VEHICLE

BACKGROUND OF THE INVENTION

1. Field of the Invention

The present invention relates to a method for ascertaining a height profile of a road situated ahead of a vehicle, to a corresponding device, as well as to a corresponding computer program product.

2. Description of the Related Art

Active driver assistance systems which autonomously brake in hazardous situations (PSS) or control the driving velocity (ACC) with the aid of radar or video (stereo or mono) are used in more and more vehicles.

A great advantage of the stereo/video systems or systems including a radar and a mono video camera, which are widely used or integrated as standard into vehicles by now, over pure radar systems is to be seen in that it is possible to measure not only the frontal distance from objects and their horizontal angle, but also the spatial dimensions of the object (such as a size of the object) or a distance from the object to a vehicle or a different point of reference. This may be used for different safety or comfort functions.

Published German patent application document DE 10 2004 017 115 A1 describes a method for automatic cruise control for a vehicle having an automatic or automated transmission.

BRIEF SUMMARY OF THE INVENTION

The present invention provides a method for ascertaining a height profile of a road situated ahead of a vehicle, the method including the following steps:
 reading in a movement profile of an object which is provided by an image sensor, the movement profile being read in as a plurality of images; and
  reading in at least one parameter with regard to the object from a parameter sensor which is independent of the image sensor; and
 determining the height profile of the road situated ahead of the vehicle by using at least one vertical position of the object in the image and the parameter for the purpose of ascertaining the height profile of the road situated ahead of the vehicle.

A height profile may, for example, be understood to mean a spatial profile of a topographic height over which a road leads, in particular on which the vehicle is going to travel in the future. The height profile includes in this case multiple points or a sequence of supporting points, each being at a different distance from the vehicle and each being assigned a topographic height, either absolute or in relation to an instantaneous topographic height, on which the vehicle is traveling. A movement profile may be understood to mean a trajectory of an object (i.e., a change in the position of the object) in multiple images which are recorded consecutively. A parameter may be understood to mean a value which [represents] a property of the object or a relation of the object to another object such as a vehicle. An image sensor may, for example, be understood to mean a sensor which provides a two-dimensional, optically detectable image of the object. A parameter sensor may, for example, be understood to mean a sensor which also provides a two-dimensional, optically detectable image of the object or which, for example, provides a piece of information about the object or the distance of the object from the vehicle by using high-frequency electromagnetic radiation (e.g., radar radiation).

The approach presented here is based on the finding that the ascertainment of a height profile of a road situated ahead of the vehicle becomes possible with the aid of the advantageous evaluation or linkage of data from multiple cost-effectively available sensors. In this case, the failure of a satellite-assisted positioning system or the lack of a suitable map for the area in which the vehicle is instantaneously located may be compensated for with the aid of technologically simple means. The height profile of the road situated ahead of the vehicle may be determined in this case by using at least one optically detected image of the object and a distance of the object from the vehicle, the distance of the object from the vehicle being provided, for example, by a special distance sensor such as a radar sensor or from a stereo camera.

The approach presented here is particularly advantageous due to the fact that further information about a topographic height profile is provided, which may be used as a replacement for or to verify a map material for an area which is instantaneously traveled by the vehicle, with the aid of a technologically readily implementable linkage of data or signals which are already present in most cases. With the aid of the approach presented here, it is also possible, at least in some cases, to very readily compensate for a failure of the satellite-assisted positioning system.

One specific embodiment of the present invention is advantageous in which in the step of reading in, the parameter is read in by a radar sensor, in particular a distance of the object from the vehicle being read in as the parameter. Such a specific embodiment of the present invention offers the advantage that a radar sensor which is in most cases already integrated as standard in modern vehicles provides very precise information in particular about the distance of the object from the vehicle, so that the determination of the height profile may also be ascertained very precisely.

One specific embodiment of the present invention is furthermore also conceivable in which in the step of reading in, the parameter is read in by a further image sensor, in particular that image sensor which forms, together with the image sensor, a stereo camera in the vehicle. Such a specific embodiment of the present invention also offers the advantage that a very precise determination of the height profile of a road situated ahead of the vehicle is possible with the aid of available components which are often already integrated as standard in modern vehicles.

According to another specific embodiment of the present invention, a movement profile of another vehicle preceding the vehicle may be read in as the object in the step of reading in and, as a parameter, a parameter with regard to the other vehicle may be read in as the object in the step of reading in. Such a specific embodiment of the present invention offers the advantage that another vehicle preceding the (host) vehicle may be effortlessly detected as such in most cases, thus making it possible to unambiguously ascertain a point of reference for the determination of the height profile. For this purpose, the movement of this other vehicle may be identified, for example, by evaluating a Doppler shift of a radar signal and/or by evaluating the color of lights of this other vehicle.

One specific embodiment of the present invention is particularly advantageous in which in the step of determining, the height profile is determined by using a distance of one edge of the object in two chronologically consecutively recorded images of the object, from the movement profile and/or from a distance of the object from the vehicle. Such a specific embodiment of the present invention offers the advantage that an implementation of the determination of the height profile is possible which is to be implemented very easily circuitry-wise or numerically.

A height profile may be illustrated particularly precisely when the height profile is determined in the step of determining by using a piece of inclination information, the piece of inclination information representing an inclination of the vehicle about a pitch axis. In particular when the (host) vehicle travels across a tilted area of the road, this instantaneous inclination of the host vehicle may also be taken into account when determining the height profile of the road, so that this height profile may be ascertained very precisely.

A determination of a height profile on the basis of particularly small areas in an image may result in an imprecise determination of this height profile. In one particularly advantageous specific embodiment of the present invention, the height profile may be determined in the step of determining by using an area of the object, the height profile being in particular determined by using a change in the area of the object. An area of the object may, for example, be understood to mean an area by which the object is represented in the image. This area may be, for example, a cross-sectional area of the object which is detected by the image sensor from the view angle of the image sensor in the direction of the object. Such a specific embodiment of the present invention offers the advantage that a change in the area of the object may be ascertained essentially more precisely than a shift of a narrow line in an image, for example. At the same time, such a specific embodiment of the present invention also offers the advantage that the object may furthermore be used to determine the height profile when parts of the object are already hidden due to unevenness of the ground or the road.

Furthermore, the approach presented here provides a method for operating a vehicle, in particular a motor vehicle, the method including the following steps:
the steps of the method for ascertaining a height profile of a road situated ahead of a vehicle according to one variant of the approach presented here; and
providing a gear shifting signal, when a topographic height, which is in a predetermined relation to the topographic height in the instantaneous position of the vehicle, is detected in the ascertained height profile at a predetermined distance from the vehicle and/or
controlling a distance between the vehicle and another vehicle by using the ascertained height profile and/or by controlling a velocity of the vehicle by using the ascertained height profile.

A gear shifting signal may, for example, be understood to mean a signal which is directly usable as a control signal for a transmission or which is usable as a piece of information (e.g., visual or acoustic) for a driver of the vehicle, indicating that the vehicle is to be driven in a certain gear.

According to another specific embodiment of the present invention, a step of activating a transmission with the aid of the gear shifting signal may be provided, the transmission being activated in such a way that a force transmission from an engine of the vehicle to at least one wheel of the vehicle is interrupted if a difference between the topographic height, which is ascertained from the ascertained height profile in the predetermined distance, and the topographic height at the instantaneous position of the vehicle is greater than a threshold value. Such a specific embodiment of the present invention offers the advantage that a very energy-efficient driving behavior of the vehicle is conveniently made possible even in situations without data reception from a satellite-assisted positioning system and/or without a map of the area which is instantaneously traveled by the vehicle.

One specific embodiment of the present invention is furthermore advantageous in the form of a device for ascertaining a height profile of a road situated ahead of a vehicle, the device having the following characteristics:
an interface for reading in a movement profile of an object which is provided by an image sensor, the movement profile being read in in a plurality of images, and for reading in at least one parameter with regard to the object by a parameter sensor which is independent of the image sensor; and
a unit for determining the height profile of the road situated ahead of the vehicle by using a vertical position of the object in the image and the parameter for the purpose of ascertaining the height profile of the road situated ahead of the vehicle.

Thus, the present invention provides a device which is designed to carry out or implement in appropriate devices the steps of one variant of the method presented here. This embodiment variant of the present invention in the form of a device also makes it possible to achieve the object underlying the present invention rapidly and efficiently.

In the present case, a device may be understood to mean an electrical device which processes sensor signals and outputs control and/or data signals as a function thereof. The device may have an interface which may be designed as hard- and/or software. In the case of a hardware design, the interfaces may, for example, be a part of a so-called system ASIC, which includes various functions of the device. It is, however, also possible that the interfaces are independent, integrated circuits or are at least partially made of discrete components. In the case of a software design, the interfaces may be software modules which are present on a microcontroller in addition to other software modules, for example.

A computer program product having program code is also advantageous, which may be stored on a machine-readable carrier, such as a semiconductor memory, a hard disk memory, or an optical memory, and is used for carrying out the method according to one of the specific embodiments described above, when the program product is run on a computer or a device. The approach presented here thus provides a computer program product having program code for carrying out the method according to one variant presented here when the program product is run on a device.

The present invention is elucidated below in greater detail, as an example, on the basis of the appended drawings.

BRIEF DESCRIPTION OF THE DRAWINGS

FIG. 1 shows a representation of a vehicle, which is traveling on a road, including a device, which is represented in the form of a block diagram, for ascertaining a height profile according to one exemplary embodiment of the present invention.

DETAILED DESCRIPTION OF THE INVENTION

Figure 2A:
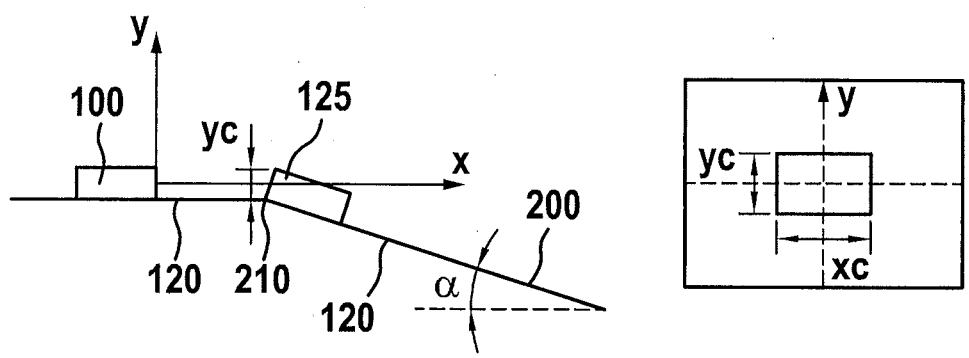
FIGS. 2A and 2B show schematic representations of different images for a possible evaluation for detecting a topographic profile of a road in the case of a downhill grade having grade α ahead of the vehicle.

In the following description of advantageous exemplary embodiments of the present invention, the elements which are illustrated in the various figures and appear to be similar are identified with identical or similar reference numerals; a repetitive description of these elements is dispensed with.

FIG. 1 shows a representation of a vehicle 100 including a device 110, which is represented in the form of a block diagram, for ascertaining a height profile 115. Height profile 115 may be understood to mean a height profile of a road 120 on which vehicle 100 is going to travel in a future time window. Another vehicle 125 which is traveling on a grade of road 120 ahead of (host) vehicle 100 is illustrated on road 120 in FIG. 1. In order to detect (topographic) height profile 115 on road 120, device 110 has at least two sensors which are independent of one another. In this case, the sensors are independent in the sense that the variable measured by them may be detected in each sensor independently from the variable measured in the other sensor. For this purpose, device 110 includes, according to the representation from FIG. 1, a stereo camera 130 which has two recording (mono) cameras 130A and 130B which are independent of one another in each case. Images 140A and 140B of each of the two cameras 130A and 130B may then be transferred via a (reading-in) interface 132 to a device 135 for determining and evaluated in such a way as to determine in device 135 for determining the position of other vehicle 125 with regard to the distance as well as to a topographic height 137 in relation to an instantaneous topographic height 138 of vehicle 100. If the determination of topographic height 137 of other vehicle 125 is carried out consecutively multiple times within one time window, it is possible to determine height profile 115 as a chain of topographic height points 137 and to use this ascertained height profile 115 for vehicle 100 for other functions. For example, a gear shifting signal 145 which is based on ascertained height profile 115 and which is usable [to show] to a driver of vehicle 100, who is not illustrated in FIG. 1, on a display unit 150 a piece of information about a favorable gear choice or which is usable as a control signal for a transmission 155 (e.g., an automatic transmission), may be output by device 135 for determining (or by a correspondingly designed subunit). For example, a discontinuation of the transmission of a force from an engine 160 of the vehicle to at least one wheel 165 of the vehicle may take place in transmission 155 on the basis of gear shifting signal 145. It is also conceivable that gear shifting signal 145 is directly transferred to engine 160 in the case of an electric vehicle and used to control the torque or the power output of engine 160 to wheels 165 (now, for example, without the relaying of transmission 155). Thus, gear shifting signal 145 does not need to be understood to mean only a signal for controlling transmission 155 or for displaying a preferred gear choice to a driver of vehicle 100, but it may also be directly understood to mean a control signal for the engine. Gear shifting signal 145 may also be used to control transmission 155 or engine 160 in such a way that vehicle 100, for example, keeps a predefined velocity within a tolerance range and/or that vehicle 100 keeps a predefined distance from other vehicle 125 within a tolerance range.

Additionally or alternatively to one of cameras 130A or 130B, device 110 for ascertaining height profile 115 may also have a radar and/or lidar sensor 170 which provide(s), as parameters 172 to the images of both cameras, a distance 175 between a front area of vehicle 100 and a rear area of other vehicle 125 to device 135 for determining. Device 135 for determining may also determine height profile 115 from images 140A or 140B of cameras 130A or 130B and parameter 172 in a manner just described above.

It is also conceivable that device 135 for determining uses the images of both cameras 130A and 130B as well as parameter 172 to compute height profile 115. Device 135 for determining should essentially receive at least one image 140A of a camera 130A and a further parameter in order to determine height profile 115 of road 120, the parameter now representing (radar and/or lidar) parameter(s) 172 being provided by radar and/or lidar sensor(s) 170 or image 140B of other camera 130B.

The approach presented here thus makes a predicted road topography possible with the aid of stereo/video or mono/video and radar and/or lidar sensor(s). In this case, the method provided here represents a possibility of estimating the topographic profile of road 120 situated ahead from object data (e.g., of a preceding other vehicle 125) which were recorded with the aid of stereo/video sensor 130 or a radar sensor 170 and a mono camera 130A or 130B. p Object data (140A, 140B) or 172 which are recorded with the aid of a stereo/video or a mono video and a radar and/or lidar sensor(s) are used to predict therefrom the topography of future road profile 120. This topography may be used to make the automatic cruise control, shifting of transmission 155 or turning off of internal combustion engine 160 during the trip (in particular in the case of a hybrid vehicle as vehicle 100) more energy-efficient according to present future road profile 120. If topographic GPS data are not available for certain driving routes (e.g., due to a lack of maps or in the case of a disturbed GPS reception), an anticipatory and energy-efficient driving of the vehicle may still be made possible in this way.

A computation without GPS data of the road topography situated ahead may take place in device 135 for determining, for example, by evaluating the vertical movement of oncoming and/or preceding vehicles 125.

Preceding vehicles 125 are evaluated, for example, with regard to the change in their dimensions in the x direction (i.e., horizontal movement) and the y direction (vertical movement).

The degree of change in the vehicle dimensions (e.g., in the case of a vehicle which seems to be "sinking into the ground") or of the displacement (e.g., of the vehicle top edge) in the y direction (dy) between two recorded video images and the path traveled in-between by the preceding vehicle corresponding to the following equation (1)

$$dx \approx d\text{host}(t0-1) + d\text{host2Target}(t1) - d\text{host2Target}(t0) \qquad (1)$$

explains the grade change situated ahead.

Here, the variables used in equation (1) describe the following relationships:

dhost(t0−1): traveled route of host vehicle 100 between two measuring points dhost2Target(t1): distance from preceding vehicle 125 at point in time t1 dhost2Target(t0): distance from preceding vehicle 125 at point in time t0

For oncoming vehicles, dx (if the same variables are used as in equation (1)) may be computed as follows:

$$dx = d\text{host2Target}(t0) - d\text{host}(t0-1) - d\text{host2Target}(t1)$$

The prerequisite for the usability is that the distance from the object is known, i.e., either determined with the aid of radar distance measurement 175 or retrieved or computed from stereo/video data 140. The real object size may be computed from the distance and, for example, from a number of pixels which the object (e.g., other vehicle 125)

has in mono video image 140A, and the displacement of the object in the vertical direction in meters may also be determined therefrom.

Figure 2B:
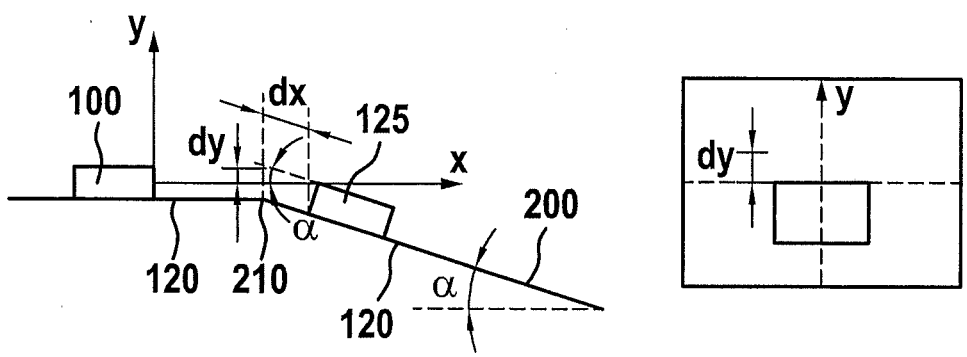

FIGS. 2A and 2B each show a schematic representation of the possible evaluation of the detection of a topographic profile of a road 120 in the case of downhill grade 200 having grade a (roadway grade) ahead of (host) vehicle 100. Other vehicle 125 is traveling on this downhill grade and seems to "descend" into the road at a beginning 210 of downhill grade 200. FIG. 2A shows the area of other vehicle 125 at beginning 210 of downhill grade 200 the way it is perceived by an optical sensor in vehicle 100. Other vehicle 125 appears in this case in a horizontal dimension xc (dimensions of preceding vehicle in the x direction) and a vertical dimension yc (dimensions of preceding vehicle in the y direction). Now, if other vehicle 125 continues traveling on route dx (dx=traveled route between 2 measuring points) on downhill grade 200, a position or size change of preceding vehicle 125 in the y direction (dy) will be recognizable in camera image (140A, 140B) of one of cameras 130 of vehicle 100. This is illustrated in FIG. 2B, it being apparent from the representation of FIG. 2B that area 230 representing other vehicle 125 has shifted in the negative y direction. It was assumed in this case that vehicle 100 is standing or traveling (i.e., α(host)=0 applies) on an area without grade α(i.e.,) α=0°) and thus the change in the grade is not to be also taken into account by a vehicle 100 which is already traveling on an inclined road section when detecting the height profile of road 120 (dα=α). The intrinsic vehicle inclination and the grade change determined from object data (140A, 140B) or 172 thus result in an estimation for the roadway grade situated ahead.

The following relationships or equations may be used in this case for an estimation of the grade change ((α(predicted)) between other vehicle 125 which is recognized as an object and (host) vehicle 100:

$$d\alpha = \arcsin(dy/dx) \quad (2)$$

$$d\alpha + \alpha(\text{host}) = \alpha(\text{predicted}) \quad (3)$$

$$\alpha(\text{predicted}) = \arcsin(dy/dx) + \alpha(\text{host}) \quad (4)$$

Height profile 115 which is ascertained by using the above-described relationships may then be used to control transmission 155 of vehicle 100 (or as information for a driver of vehicle 100). This results in different possible operating strategies for the velocity and/or distance control (ACC=adaptive cruise control) of vehicle 100:
1. If vehicle 100 has a hybrid drive, internal combustion engine 160 may be turned off earlier or not turned on in the first place, if future grade α of road 120 is sufficient to compensate for a system deviation to be defined (i.e., falling below or exceeding a desirable velocity of vehicle 100 or of a desirable distance of vehicle 100 from other vehicle 125).
2. If vehicle 100 is a purely electric vehicle, an acceleration may be dispensed with if a system deviation is small enough and future grade α is sufficient to compensate for this system deviation.
3. In the event that vehicle 100 is a conventional motor vehicle including an internal combustion engine 160 and a manually shiftable transmission, a piece of information may be displayed on display 150 which indicates that it would be reasonable to shift into neutral and have the vehicle drive in the coasting mode.
4. If vehicle 100 is a motor vehicle including internal combustion engine 160 and automatic transmission 155 having a coasting function, the coasting mode may be activated ahead of a predicted hillside if a future grade α is sufficient to compensate for a system deviation to be defined.

The previously mentioned operating strategies may be implemented in device 135 for determining (or, for example, as corresponding subunits of device 135 for determining) and accordingly carry out the activation of transmission 155 or of engine 160 for the desirable operating mode (coasting mode or friction lock between engine 160 and wheel 165) via gear shifting signal 145.

Figure 3:
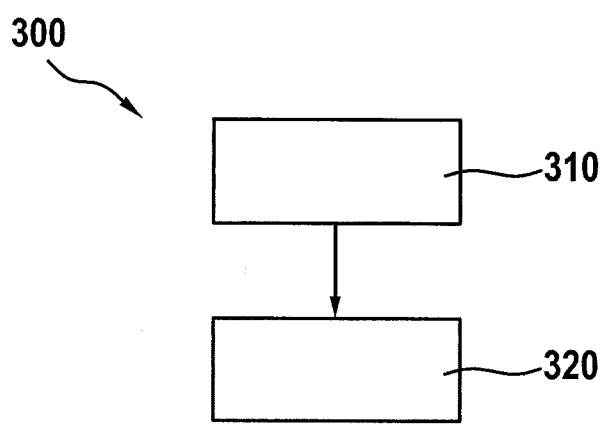
FIG. 3 shows a flow chart of a method for ascertaining a height profile according to one exemplary embodiment of the present invention.

FIG. 3 shows a flow chart of one exemplary embodiment of the present invention as a method 300 for ascertaining a height profile of a road situated ahead of a vehicle. Method 300 includes a step 310 of reading in a movement profile of an object which is provided by an image sensor, the movement profile being read in as a plurality of images, and of reading in at least one parameter with regard to the object by a parameter sensor which is independent of the image sensor. Furthermore, method 300 includes a step 320 of determining the height profile of the road situated ahead of the vehicle by using at least one vertical position of the object in the image and the parameter for the purpose of ascertaining the height profile of the road situated ahead of the vehicle.

The exemplary embodiments described and shown in the figures have only been selected as examples. Different exemplary embodiments may be combined with each other in their entirety or with regard to their individual characteristics. Also, one exemplary embodiment may be supplemented with characteristics of another exemplary embodiment.

Furthermore, method steps according to the present invention may be repeated and carried out in a sequence different from the one described.

If an exemplary embodiment includes an "and/or" link between a first characteristic and a second characteristic, this should be read in such a way that the exemplary embodiment according to one specific embodiment has both the first characteristic and the second characteristic and according to another specific embodiment it has either only the first characteristic or only the second characteristic.

What is claimed is:

1. A method for ascertaining a height profile of a road situated ahead of a vehicle, comprising:
   reading in a movement profile of an object situated on the road ahead of the vehicle, the movement profile being provided by a first image sensor, the movement profile being read in as a plurality of images; and
   reading in at least one parameter with regard to the object from a parameter sensor which is independent of the first image sensor; and
   determining the height profile of the road situated ahead of the vehicle based on at least one vertical position of the object in the image and the at least one parameter.

2. The method as recited in claim 1, wherein the at least one parameter is a distance of the object from the vehicle read in by a radar sensor.

3. The method as recited in claim 1, wherein the parameter sensor which reads in the at least one parameter is a second image sensor, and wherein the first and second image sensors together form a stereo camera in the vehicle.

4. The method as recited in claim 1, wherein the object is another vehicle preceding the vehicle.

5. The method as recited in claim 1, wherein the height profile is determined by using a distance of one edge of the object in two chronologically consecutively recorded images of the object, from at least one of (i) the movement profile and (ii) a distance of the object from the vehicle.

6. The method as recited in claim 1, wherein the height profile is determined by using an inclination information representing an inclination of the vehicle about a pitch axis.

7. The method as recited in claim 1, wherein the height profile is determined by using a change in an area of the object.

8. A method for operating a vehicle, comprising:
ascertaining a height profile of a road situated ahead of the vehicle by:
   reading in a movement profile of an object which is provided by a first image sensor, the movement profile being read in as a plurality of images; and
   reading in at least one parameter with regard to the object from a parameter sensor which is independent of the first image sensor; and
   determining the height profile of the road situated ahead of the vehicle based on at least one vertical position of the object in the image and the at least one parameter; and at least one of:
(i) providing a gear shifting signal when a topographic height, which is in a predetermined relation to the topographic height in the instantaneous position of the vehicle, is ascertained in the determined height profile at a predetermined distance from the vehicle; and
(ii) at least one of controlling a distance between the vehicle and another vehicle by using the determined height profile and controlling a velocity of the vehicle by using the determined height profile.

9. The method as recited in claim 8, further comprising:
activating a transmission with the aid of the gear shifting signal, the transmission being activated in such a way that a force transmission from an engine of the vehicle to at least one wheel of the vehicle is interrupted if a difference between the topographic height, which is ascertained from the determined height profile in the predetermined distance, and the topographic height at the instantaneous position of the vehicle is greater than a threshold value.

10. A device for ascertaining a height profile of a road situated ahead of a vehicle, comprising:
   an interface for reading in a movement profile of an object situated on the road ahead of the vehicle, the movement profile being provided by a first image sensor, the movement profile being read in as a plurality of images, and reading in at least one parameter with regard to the object from a parameter sensor which is independent of the first image sensor; and
   a calculation unit for determining the height profile of the road situated ahead of the vehicle based on at least one vertical position of the object in the image and the at least one parameter.

11. A non-transitory computer-readable data storage medium storing a computer program having program codes which, when executed on a computer, performs a method for ascertaining a height profile of a road situated ahead of a vehicle, the method comprising:
   reading in a movement profile of an object situated on the road ahead of the vehicle, the movement profile being provided by a first image sensor, the movement profile being read in as a plurality of images; and
   reading in at least one parameter with regard to the object from a parameter sensor which is independent of the first image sensor; and
   determining the height profile of the road situated ahead of the vehicle based on at least one vertical position of the object in the image and the at least one parameter.

* * * * *